United States Patent
Mandyam et al.

(10) Patent No.: US 6,393,074 B1
(45) Date of Patent: May 21, 2002

(54) DECODING SYSTEM FOR VARIABLE-RATE CONVOLUTIONALLY-CODED DATA SEQUENCE

(75) Inventors: Giridhar D. Mandyam, Dallas; Yuan Kang Lee, Richardson; Alberto Guiterrez, Plano, all of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/224,047

(22) Filed: Dec. 31, 1998

(51) Int. Cl.[7] .............................................. H04L 1/08
(52) U.S. Cl. ...................................... 375/341; 714/795
(58) Field of Search .............................. 375/262, 265, 375/340, 341; 714/774, 780, 792, 795

(56) References Cited

U.S. PATENT DOCUMENTS

| | | | |
|---|---|---|---|
| 5,414,796 A | 5/1995 | Jacobs et al. | 395/2.3 |
| 5,504,773 A | 4/1996 | Padovani et al. | 375/200 |
| 5,710,784 A | 1/1998 | Kindred et al. | 371/43 |
| 5,742,734 A | 4/1998 | DeJaco et al. | 395/2.35 |
| 5,774,496 A | 6/1998 | Butler et al. | 375/225 |
| 5,777,990 A | 7/1998 | Zehavi et al. | 370/335 |
| 6,108,372 A * | 8/2000 | Tidemann, Jr. et al. | 375/225 |
| 6,112,325 A * | 8/2000 | Burshtein | 714/774 |

OTHER PUBLICATIONS

"Accelerating Viterbi Decoder Stimulation," Tom Hardin et. al., Istari Design, Inc. Technical Note, www.istari–design-.com/vitnote.htm (1998), pp. 1–8.

"Applying List Output Algorithms to a GSM–based Mobile Cellular Radio System," Volker Kühn, Department of Communications Engineering, University of Paderborn.

"On the Bit Error Behavior of Coded DS–CDMA with Various Modulation Techniques," Nikolai, et, al., Department of Telecommunications, University of Bremen.

"On the Optimisation of a Noncoherent CDMA System Based on M–ary Orthogonal Modulation," Benthin et. al., pp. 1–20.

* cited by examiner

*Primary Examiner*—Amanda T. Le
(74) *Attorney, Agent, or Firm*—Ronald O. Neerings; Wade James Brady, III; Frederick J. Telecky, Jr.

(57) ABSTRACT

A multi-rate data receiver includes a decoding section for processing the received encoded data symbols via multiple paths to make a determination as to the rate of the received data. A statistical analysis is made of the incoming data prior to decoding, and rate selection made among one of the multiple highest rates. If the determination is not that the data is associated with the highest rate, the data is processed through multiple parallel decoding paths and the decoded data on the output thereof evaluated to determine which of the multiple paths is acceptable and associated with the incoming data rate.

30 Claims, 4 Drawing Sheets

DECODING SYSTEM FOR VARIABLE-RATE CONVOLUTIONALLY-CODED DATA SEQUENCE

TECHNICAL FIELD OF THE INVENTION

The present invention pertains in general to a spread spectrum communication system and, more particularly, to a system in which variable rate data is transmitted and coded.

BACKGROUND OF THE INVENTION

In digital communication systems for transmitting voice and utilizing spread spectrum modulation, the transmitter typically utilizes a vocoding system that encodes voice information at a variable rate, which variable rate is utilized to allow the data rate to be lowered during pauses and other absences of voice activity. This facilitates a reduction in the level of interference caused when undesignated receivers receive transmissions from this transmitter. At the designated receiver, a similar vocoding system is employed to reconstruct the voice information from the received signal.

The IS-95 CDMA (Code Division Multiple Access) System employs variable rate voice coding in order to reduce the transmit power, and thereby increase system capacity for both the forward and reverse links. Furthermore, in order to maintain high voice quality, the rate information is not transmitted to the receiver. Therefore, the receiver must determine the data rate in order to adequately decode the data. This latter point is made clear by considering the following examples. Suppose the transmitter sends the rate information of the next frame with the current frame. Assuming that this voice coding rate is encoded with a forward error correction code then this would lead to an additional delay of one frame in the voice path, which is undesirable for maintaining voice quality. Alternatively, suppose the transmitter sends the rate information of the current frame at the beginning of the current frame. In this case, the receiver is required to decode the frame in order acquire the rate information, which defeats the purpose. Note that an additional benefit of not transmitting the rate information is less overhead. Thus, it is necessary for the vocoding system at the receiver to determine the data rate and then decode the data at this data rate.

Perhaps the most straightforward rate detection method is to decode the frame once at every possible rate. Then, by either checking a CRC (Cyclic Redundancy Code), Viterbi decoder metrics, or some other means the receiver guesses at the transmission rate. Since it is desirable to minimize power consumption at the mobile device, it is beneficial to simplify the computations required in determining the rate. To this end, several less optimum rate detection methods have been suggested. In one application, a classification algorithm is employed which detects the vocoder transmission rate for Rate set 1 (9600 bps, 4800 bps, 2400 bps, and 1200 bps), and Rate set 2 (14,400 bps, 7200 bps, 3600 bps, and 1800 bps) of IS-95, respectively. (The highest data rate frame, which corresponds to, for example, a 9600 bps frame for Rate set 1 is referred to as a "full-rate" frame. The other frames are appropriately referred to as a "half-rate," "quarter-rate," and "eighth-rate" frames, respectively.) Essentially, the algorithms compute certain thresholds that are subsequently used to determine a source rate. The algorithm appears to give good performance as compared to the initially suggested method of Viterbi decoding once for each rate in the rate set.

One system that has been previously described for decoding variable rate data is that disclosed in U.S. Pat. No. 5,774,496, issued Jun. 30, 1998, which is incorporated herein by reference. In this decoding system, there are provided four decoding circuits, one associated with each data rate. Each of the decoding systems is provided with some type of "quality indicator" that allows the decoding operation to be evaluated as to the results thereof. Therefore, the received signals are processed through the decoding systems at their associated data rate and the integrity of the decoded data outputs thereof compared with each other with some type of predetermined quality criteria. Once a decision has been made as to which of the decoding circuits has the best quality output, this is designated as the acceptable rate for that frame and the decoded data decoded thereby is utilized as a single output. This occurs for each frame.

The disadvantage of the above disclosed multi-rate decoding system is that it requires significant processing power in order to perform all of the decoding operations. This is especially true for the high data rate decoder circuits, since they require both more complex circuitry and take a correspondingly larger amount of power.

SUMMARY OF THE INVENTION

The present invention disclosed and claimed herein comprises a method and apparatus for receiving variable-rate data in a variable-rate communications system. The data rate of the received signal is determined by first receiving the encoded data and then evaluating this encoded data using predetermined data rate criteria. The step of evaluating the encoded data is operable to determine if the encoded data is associated with at least one data rate. If the data rate is determined in the step of evaluating to be at the at least one data rate, then the data is encoded at that at least one data rate. If the data rate is determined not to be at the at least one data rate prior to a decoding operation, then the encoded data is evaluated at multiple data rates along multiple decoding paths. In each. of the multiple paths, the data is fully decoded at one of the available rates and then the decoding operation evaluated as to the quality of the decoded data. An error metric is provided for each of the decoded data paths and these error metrics compared with predetermined error criteria. The one of the paths having the best or lowest error metrics is selected as the data rate of the encoded data.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
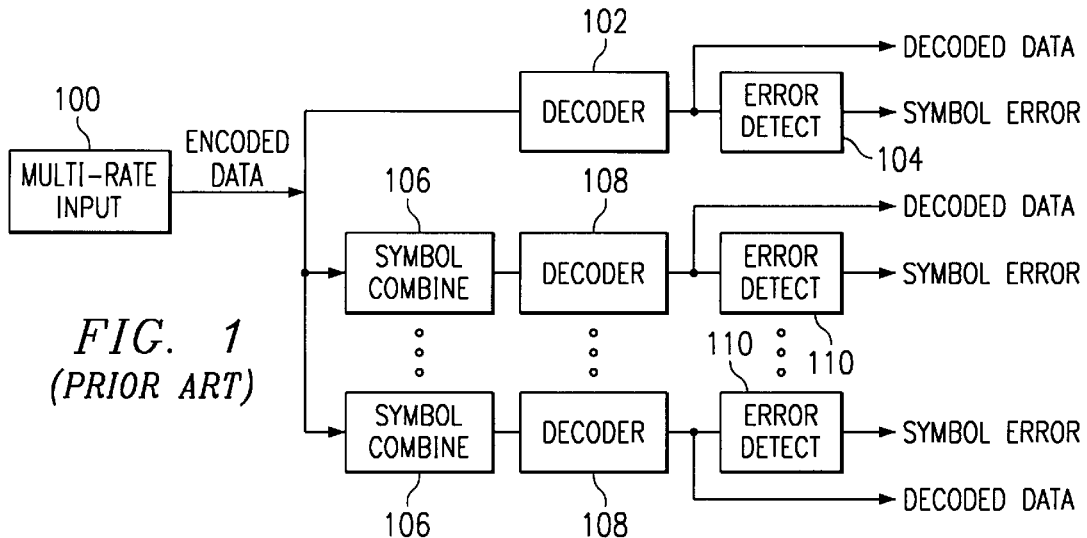
FIG. 1 illustrates an overall simplified block diagram of a prior art multi-rate decoding system.

Referring now to FIG. 1, there is illustrated a block diagram of the decoding portion of a prior art variable rate communications system. This is representative of a CDMA cellular telephone system which is operable to receive encoded data that can be encoded at multiple rates. A multi-rate data input is received as encoded data from a block 100 which is then provided to multiple decoder paths, each associated with one of the multiple data rates. Although only a single path is needed for the operation of decoding, it is necessary to have multiple paths to provide decoding at each of the separate data rates to determine which data rate is actually associated with the data.

In this multi-path configuration, the received data is in the form of demodulated symbol data which is stored in a buffer (not shown) and provided to each of the multiple decoding paths at the same time. For the highest data rate, the data is passed along a path to a decoder 102 which is operable to decode the data to provide a decoded data output, and also provide an input to an error detect circuit 104. The decoded data is buffered, and the error detect circuit 104 is operable to determine the presence of symbol errors. The decoder 102, as described hereinbelow, is a Viterbi decoder, a conventional decoder. This decoder 102 can directly decode the data since it is at the full rate.

For rates other than the full rate, it is necessary to process the data with a symbol combiner 106. The symbol combiner 106 is necessary since, for the forward link transmitted frames, symbols are repeated for lower rate frames to achieve a constant number of symbols in a frame as transmitted. In order to provide an increase in quality, at the receiver the repeated symbols are summed and scaled to provide for each set of repeated symbols a combined symbol representative of the original symbol before repetition on the transmit end. The symbol combiner 106 sums a fixed number of symbols and provides a scaled sum symbol data output to a corresponding decoder 108. The output of the decoder 108 provides decoded data and also provides an input to an error detect circuit 110.

Each of the lower data rate paths is processed in parallel with the higher data rate paths. Each path provides a decoded data output, as well as a symbol error output. By examining the symbol error outputs, it is then possible to determine the quality of the decoding operation. This quality, of course, will be best on the path wherein the decoder operates at the data rate associated with the received symbol data. However, it is noted that there is a requirement that each frame is completely decoded before the next frame arrives. Therefore, this can be accomplished by processing each path in parallel with the other or decoding each path sequentially, which requires a very fast rate. Regardless of the technique employed, a full decoding operation must be performed on each frame of data before a decision can be made, thus requiring more complex circuitry and more power for the processing operation.

Figure 2:
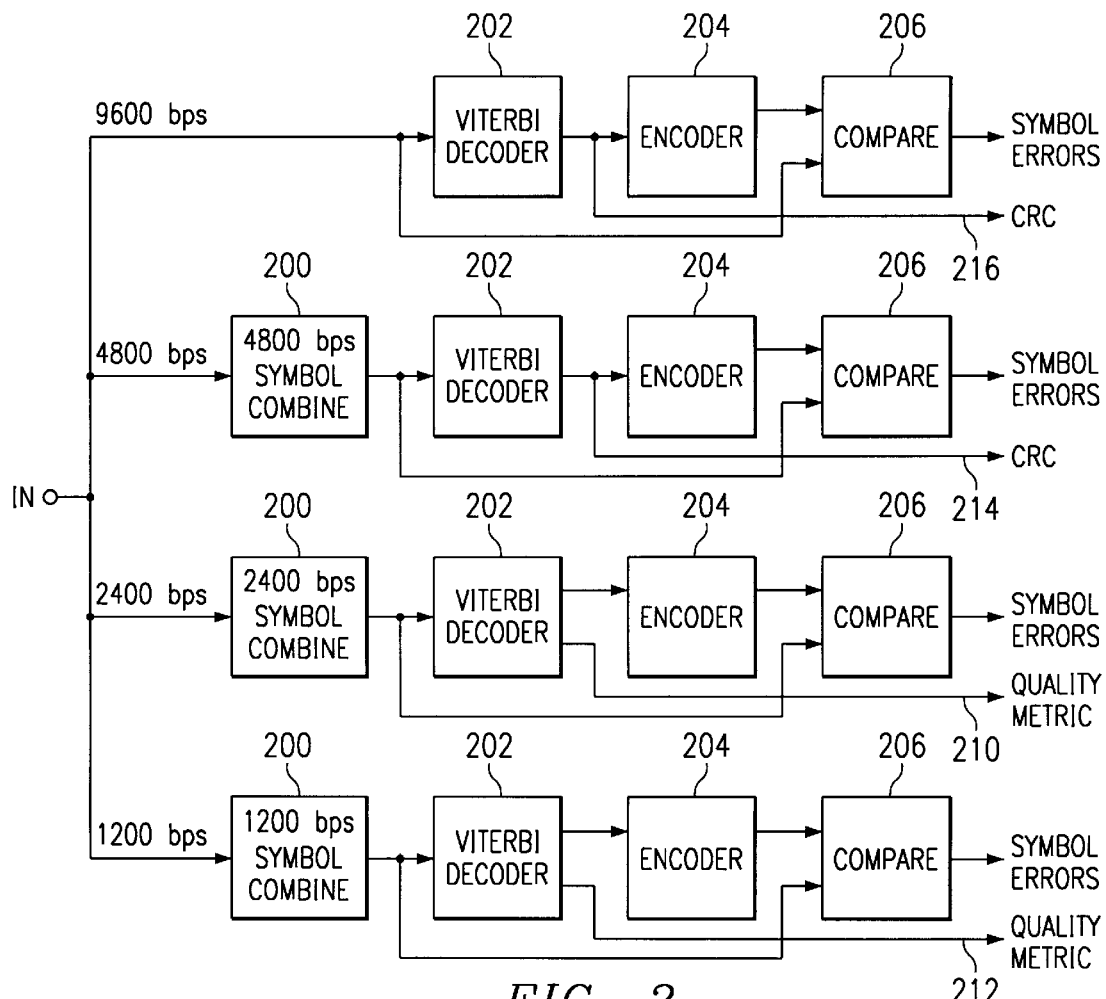
FIG. 2 illustrates a more detailed block diagram of the prior art multi-rate decoding system.

Referring now to FIG. 2, there is illustrated a more detailed block diagram of the prior art embodiment of FIG. 1. In this detailed example, there are provided four data rate paths, one for the full data rate at 9600 bps, one at the half data rate of 4800 bps, one at the quarter data rate of 2400 bps and one at the eighth data rate of 1200 bps. Each of the paths has associated therewith a Viterbi decoder 202. The Viterbi decoder 202 in each of the paths is operable to decode the symbol data that is received at the data rate associated with its path. For the 9600 bps data rate path, the Viterbi decoder 202 input is input directly to the decoder 202. However, for each of the Viterbi decoders 202 associated with the less than full-rate paths, the data must be passed through a symbol combiner 200. This provides convolutionally-encoded scaled sum symbol data, the output of the Viterbi decoders 202 providing corresponding decoded data.

The Viterbi decoders 202 associated with the quarter-rate path of 2400 bps and the eighth-rate path of 1200 bps each include means for providing quality metrics on lines 210 and 212, respectively, which are output to a microprocessor (not shown). These quality metrics on lines 210 and 212 each are typically represented by a single bit value for each frame. This is typically referred to as a "Yamamoto Quality Metric" and is a well-known indicator of data quality. These quality metrics are sufficient for the lower rate data paths. Although they could be utilized for the higher rate data paths of 9600 bps and 4800 bps, these quality metrics are normally not necessary at the higher data rates, as other techniques are available.

Each of the Viterbi decoders 202 provides on the output thereof decoded data bits. The output of each of the Viterbi decoders 202 is input to an encoder 204 which is operable to re-encode the decoded symbol data. The output of the encoder 204 for each of the paths is input to one input of a comparator 206. The other input of the comparator 206 is connected to the raw symbol data input to each of the Viterbi decoders 202. This constitutes, for the 9600 bps data rate path, the demodulated symbol data and, for the remaining paths, the scaled sum symbol data from the combiner 200. A true output from the comparators 206 represents symbols that do not match. Each time that a symbol mismatch is determined, there will be a symbol error and a corresponding true output from the associated comparator 206. This is determined by inputting the output of the comparators 206 to corresponding counters (not shown) which count the number of symbols that do not match foe the associated path. This counter then provides on the output thereof a symbol error value for the associated path which is represented by an 8-bit value.

For the Viterbi decoders 202 associated with the full-rate path of 9600 bps and the half-rate path of 4800 bps, the output of the Viterbi decoders 202 are output on lines 216 and 214, respectively, to cyclic redundancy check (CRC) circuits (not shown) to check the CRC bits of the decoded symbol data (bit data) from the respective Viterbi decoders 202. This provides an indication of quality for the particular decoded data. Typically, the results are represented by a single bit value for a frame. It should also be noted that the disclosed technique applies not only to convolutional code, but also to other types of forward error correction codes.

Figure 3:
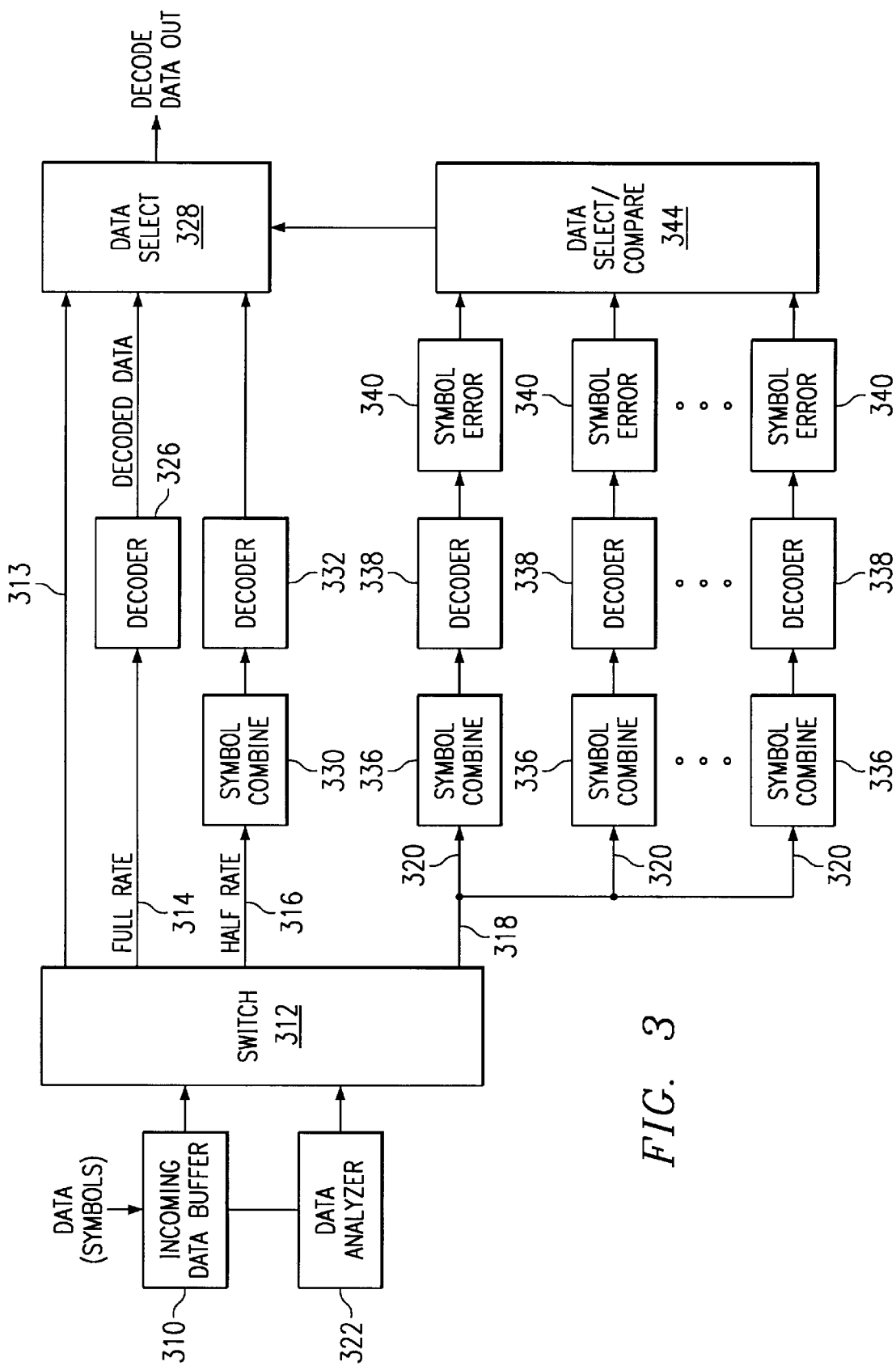
FIG. 3 illustrates a basic block diagram of a multi-rate decoding system for the disclosed embodiment.

A variable rate source code is often employed for coding of voice frames in CDMA communication systems followed by forward error correction coding. When the source rate is not known to the receiver a priori, a rate detection algorithm can reduce the computational complexity with respect to decoding once for every possible source rate. Referring now to FIG. 3, there is illustrated a block diagram of the disclosed embodiment. In FIG. 3, the incoming data is received and buffered in a buffer 310. A switch 312 is provided for routing the incoming data from the buffer 310 to one of a plurality of decoding paths, each associated with a different data rate. Each of the paths provides a decoding operation which, at the full data rate, does not require any symbol combiners. The decoding paths operating at less than the full data rate require symbol combiners. The switch 312 is operable to select the decoding path to which the data stored in buffer 310 is to be routed. In the disclosed embodiment of FIG. 3, there are three separate decoding paths that data can be routed to; a first decoding path 314 associated with the full data rate, a second decoding path 316 associated with the half data rate, and a third decoding path 318 associated with all remaining data rates. The third path 318 is divided up into additional decoding paths 320, these decoding paths 320 each associated with decode processing circuits, as will be described hereinbelow.

The switch 312 has the operation thereof determined by a data analyzer block 322. The data analyzer block 322 is operable to examine the incoming data and make a statistical decision as to whether the data represents either data operating at the full data rate or the half data rate, and if it does not represent one of those two, then it makes a decision that it must be one of the remaining data rates. If the data rate is determined from examining the data as being the full data rate, the switch 312 is configured to route the data to the decoding path 314. If the data rate is determined from examining the data as being the half data rate, the switch 312 is configured to route the stored symbol data from the buffer 310 to the decoding path 316, and if the data rate of the received and buffered data is determined to be neither the full data rate or the half data rate, then the data stored in the buffer 310 is routed to the decoding path 318.

When data is routed to the full-rate path 314, it is decoded with a decoder 326 and then the decoded data is passed to a data select block 328. In this mode, the only processing that is performed is on the full-rate data. If data is routed to the half-rate path 316, the data must first be passed through a symbol combiner 330 and then decoded with a decoder 332. The decoder 332 and the symbol combiner 330 operate as a single processing path without the need to process through the other paths. The output of the decoder 332 is then passed to the data select block 328.

When the data is determined not to be at the full data rate or the half data rate, the data is routed to the path 318 and then to multiple processing paths. Each of these processing paths operates with a symbol combiner 336, the output of which is connected to an associated decoder 338 and then the data decoded therefrom is processed through a symbol error block 340. This operates in accordance with the process described hereinabove with respect to the Prior Art FIGS. 1 and 2. The paths 320 are all operated in parallel, i.e., the data is fully decoded at each of the associated data rates, and the output of the symbol error blocks 340 associated therewith are input to a data select/compare block 344 to determine among the multiple paths which path has the lowest error. This lowest error path is then selected with the data select block 328 and the output of the select one of the decoders 338 on the desired path is selected. It is noted that the data for each of the steps must be buffered during the decoding operation before it is output. Of course, as will be described hereinbelow, if the symbol error rate is too high on all of these paths, then the frame is merely discarded. The data select block 328 is operable to work in conjunction with switch 312 according to signals received from the switch 312 over a signal line 313. If the switch 312, as controlled by the data analyzer 322, passes data on either the full rate path 314, the half-rate path 316, or the third path 318, the data select block 328 will be signaled by the switch 312 to pass the respective path data.

Figure 4:
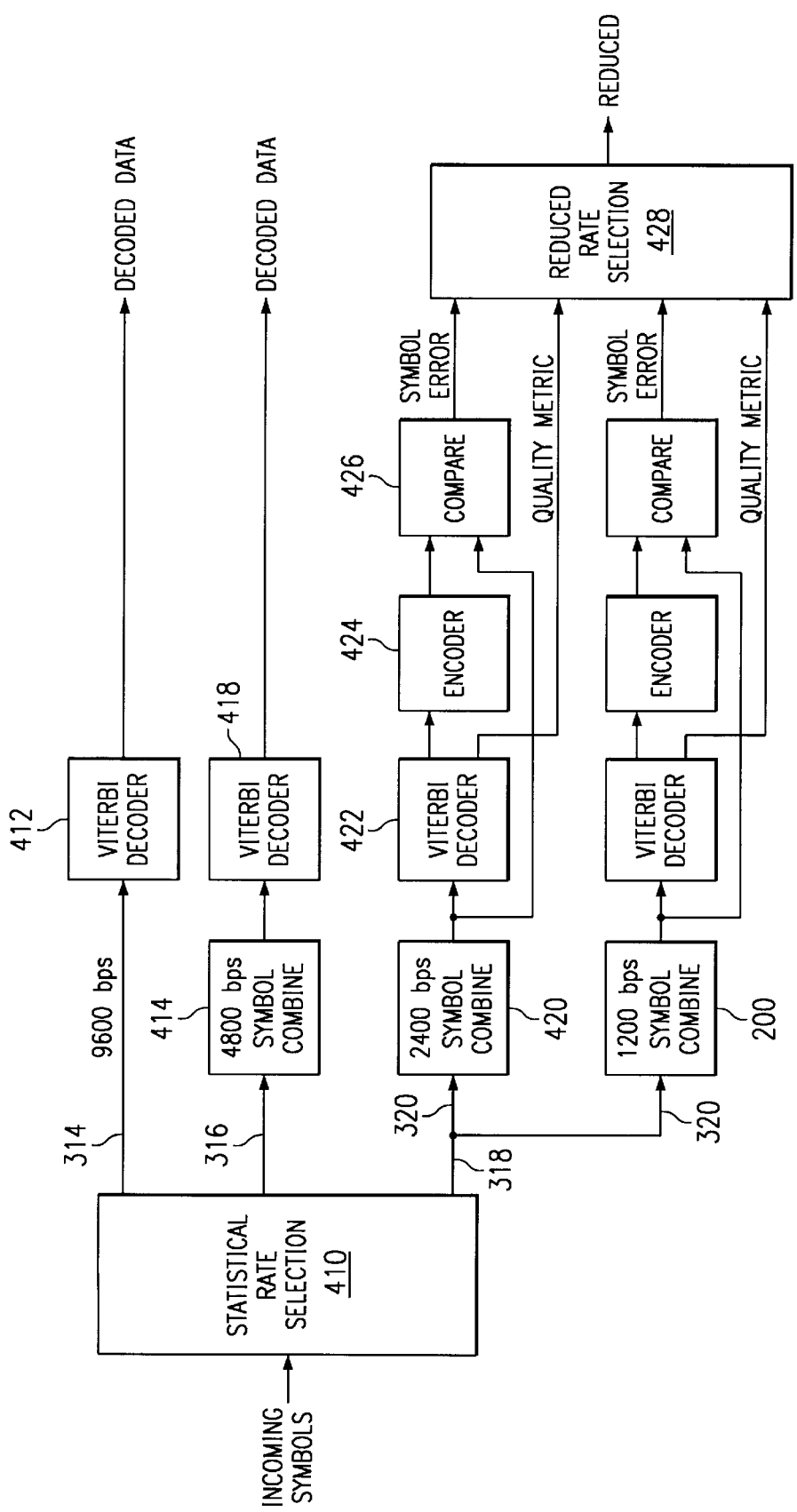
FIG. 4 illustrates a more detailed block diagram of the embodiment of FIG. 3.

Referring now to FIG. 4, there is illustrated a more detailed block diagram of the embodiment of FIG. 3. In the embodiment of FIG. 4, there are only illustrated four decoding paths, one for the full data rate, one for the half data rate, one for the quarter data rate, and one for the eighth data rate, for 9600 bps, 4800 bps, 2400 bps, and 1200 bps, respectively. The four decoding paths are categorized into three decoding paths, as was the case with FIG. 3, such that the full-rate decoding path and the half-rate decoding path are "pass-through" paths, and the quarter-rate and eighth-rate decoding paths are paths wherein parallel processing is performed and a decision made between the paths. However, it should be understood that the original statistical analysis performed by the data analyzer 322 of FIG. 3 could operate on any number of paths. It could select only the full-rate path with the remaining paths being processed in parallel such that a determination can be made therebetween. At least one decoding path needs to be a pass-through path that is selected prior to any parallel processing. In such a manner, the more complex processing for the full-rate decoding path (and/or the half-rate decoding path) can be eliminated from the parallel processing and decision making operation by embedding this portion of the decision making in the data analyzer 322.

Referring further to FIG. 4, a block 410 is provided representing the statistical rate selection operation which is provided by the data analyzer 322, switch 312 and incoming data buffer 310 of FIG. 3. This selects between the three decoding paths 314, 316 and 318, with there only being illustrated two decoding paths 320, one for the quarter-rate and one for the eighth-rate decoding paths. In the full-rate decoding path 314, the 9600 bps encoded data is directly input to a Viterbi decoder 412, which provides the decode operation of the block 326 of FIG. 3. This provides on the output thereof decoded data. The statistical rate selection block 410, as described hereinabove, makes a decision based upon statistical information applied to the incoming buffered data, that the data is the full data rate. If it makes this decision, then the frame of data is passed to the Viterbi decoder 412 and decoded data output therefrom. Of course, if the decision was wrong, the data may have errors in it. If so, this just constitutes bad data.

If the statistical rate selection block 410 determined that the decoding path 316 should be selected for the half-rate data, the data will be passed to the block to a combiner block 414 to provide on the output thereof summed symbol data for input to a Viterbi decoder 418 to provide decoded data therefrom. As described hereinabove with respect to the full-rate decoding path 314, when the decoding path 316 is selected, the data will be passed to the combiner 414 and the Viterbi decoder 418 and data output therefrom without processing in the other decoding paths. If the data is erroneous due to an error in the statistical rate selection, this data is merely passed on as bad data.

When the data is passed to the decoding path 318, it will not select between two decoding paths but, rather, will be passed to both the quarter-rate decoding path and the eighth-rate decoding path. In the quarter-rate decoding path, the raw symbol data is combined with a combiner 420 and then passed to a Viterbi decoder 422 to provide decoded data at the output of the Viterbi decoder 422. The data is then re-encoded with an encoder 424, the output thereof provided to a comparator 426. The input to the Viterbi decoder 422, the output of the combiner 420, is provided as the other input of the comparator 426. This provides on the output thereof a symbol error. As described hereinabove, and not shown in FIG. 4, this symbol error is basically the output of a counter wherein the comparator is operable to provide some count function on the output thereof to count the number of symbol errors. Alternatively, this could be provided by a separate processor (not shown). In addition to providing this symbol error, there is also provided a single bit output from the Viterbi decoder 422 representing a quality metric, as described hereinabove. The symbol error and the quality metric are input to a rate selection block 428 which provides the processing necessary to determine which of the two decoding paths, the decoding path for the quarter-rate or the half-rate, that has an acceptable symbol error rate. If the error rate for both decoding paths is too high, the frame of data will basically be discarded. If one is acceptable, then its data will be selected from the output of the Viterbi decoder 422, it being noted that this is stored data.

The data analyzer 322, as described hereinabove, is capable of making a statically based decision as to the rate of the received data prior to actually performing a decoding operation. In the disclosed embodiment, it is desirable to develop a maximum-likelihood rate detection algorithm which exploits the tuple structure of the transmitted frames. For example, in a 24-bit punctured sequence for IS-95 Rate set 2, where the tuple pattern repeats up to i=384, a half-rate frame may contain pairs, a quarter-rate frame may contain 3-tuples and pairs, and the eighth-rate frame may contain 5- and 6-tuples. At the receiver there are four hypothesis formed:

$$H_1: r_i = m1_i + n_i$$

$$H_2: r_i = m2_i + n_i$$

$$H_3: r_i = m3_i + n_i$$

$$H_4: r_i = m4_i + n_i, \quad (1)$$

where $r_i$ is the observation variable, and i corresponds to the output symbols from the symbol repetition block. The rate detection algorithm will be developed for Rate set 2, since special care is required due to the symbol puncturing (or deletion). Then, the likelihood algorithm is expressed for Rate Set 1, since it is a simplification of that for Rate Set 2.

For Rate Set 2, then, the probability of receiving $r_i$ given $H_1$ and $m_{1,i}$ is expressed as $$p_1(r_i \mid H_1, m_{1,i}) = \frac{1}{\sqrt{2\pi}\sigma} \exp\left(\frac{-(r_i - m_{1,i})^2}{2\sigma^2}\right), \quad (2)$$

where it is assumed that the baseband input sample, $r_i$, is normally distributed with mean $m_{1,i}$, and standard deviation $\sigma$. The subscript, i, reflects that the mean of the input samples is dynamically changing according to the mobile radio channel. With equally likely source symbols, the distribution for $m_1$ is described by a probability mass function, $p(m_1)$, given by $p(m_1) = p(m_{1,i} = \mu_i)\delta(m_{1,i} - \mu_i) + p(m_{1,i} = -\mu_i)\delta(m_{1,i} + \mu_i)$, where $p(m_{1,i} = \mu_i)$ represents the probability that $m_{1,i}$ is equal to $\mu_i$. Expression (2) is then integrated over $p(m_{1,i})$ to obtain the conditional probability $$p_1(r_i \mid H_1) = \int_m^i p(r_i \mid H_1, m_{1,i}) p(m_{1,i}) dm_{1,i} \quad (4)$$

$$= \frac{0.5}{\sqrt{2\pi}\sigma} \exp\left(\frac{-(r_i - \mu_i)^2}{2\sigma^2}\right) + \frac{0.5}{\sqrt{2\pi}\sigma} \exp\left(\frac{-(r_i + \mu_i)^2}{2\sigma^2}\right),$$

where, $i \in \{1, 2, 4, 6, 7, 8, \ldots, 383, 384\}$.

For $H_2$, both single symbols and pairs of symbols must be considered. The single symbol conditional probability is given by $p_1(r_i \mid H_2)$, $i \in \{4, 6, 10, 12, \ldots, 382, 384\}$, and is identical to expression (4). However, $\mu$ is replaced by $\mu/\sqrt{2}$, since the symbols are transmitted at ½ the power of the full-rate symbols. For the case of pairs (2-tuples), the conditional probabilities, conditioned on $H_2$, are given by $$p_2(r_i, r_{i+1} \mid H_2, m_{2,i}, m_{2,i+1}) = \quad (5)$$

$$\frac{1}{(2\pi)^{3/2}\sigma} \exp\left(\frac{-(r_i - m_{2,i})^2 - (r_{i+1} - m_{2,i+1})^2}{2\sigma^2}\right),$$

for $i \in \{1, 7, 13, 19, \ldots, 379\}$. Averaging over $m_{2,i}$ and $m_{2,i+1}$ expression (6) is obtained.

$$p_2(r_i, r_{i+1} \mid H_2) = \quad (6)$$

$$\frac{0.5}{2\pi\sigma} \exp\left(\frac{-\sum_{i=1}^{2}(r_i - \mu_i/\sqrt{2})^2}{2\sigma_2^2}\right) + \frac{0.5}{2\pi\sigma} \exp\left(\frac{-\sum_{i=1}^{2}(r_i + \mu_i/\sqrt{2})^2}{2\sigma^2}\right),$$

Proceeding in a similar fashion, for hypothesis $H_3$, conditional probabilities for pairs and 3-tuples are required. For the case of pairs, the conditional probability, $p(r_i, r_{i+1} \mid H_3)$, $i \in \{10, 22, \ldots 382\}$ is identical to expression (6), but with $\mu/\sqrt{2}$ replaced with $\mu/2$. The 3-tuple conditional probabilities, conditioned on $H_3$, are given by $$p_3(r_i, r_{i+1}, r_{i+2} \mid H_3) = \frac{0.5}{(2\pi)^{3/2}\sigma} \exp\left(\frac{-\sum_{i=1}^{3}(r_i - \mu_i/\sqrt{2})^2}{2\sigma^2}\right) + \quad (7)$$

$$\frac{0.5}{(2\pi)^{3/2}\sigma} \exp\left(\frac{-\sum_{i=1}^{3}(r_i + \mu_i/\sqrt{2})^2}{2\sigma^2}\right),$$

for $i \in \{1, 6, 13, 18, \ldots, 378\}$.

For $H_4$ conditional probabilities for 5-tuples and 6-tuples are required. These are given by $$p_5(r_i, r_{i+1}, r_{i+2}, r_{i+3}, r_{i+4} \mid H_4) = \frac{0.5}{(2\pi)^{5/2}\sigma} \exp\left(\frac{-\sum_{i=1}^{5}(r_i - \mu_i/\sqrt{8})^2}{2\sigma^2}\right) + \quad (8)$$

$$\frac{0.5}{(2\pi)^{5/2}\sigma} \exp\left(\frac{-\sum_{i=1}^{5}(r_i + \mu_i/\sqrt{8})^2}{2\sigma^2}\right),$$

for $i \in \{10, 18, \ldots, 370, 378\}$, and $$p_6(r_i, r_{i+1}, r_{i+2}, r_{i+3}, r_{i+4}, r_{i+5} \mid H_4) = \quad (9)$$

$$\frac{0.5}{(2\pi)^{5/2}\sigma} \exp\left(\frac{-\sum_{i=1}^{6}(r_i - \mu_i/\sqrt{8})^2}{2\sigma^2}\right) +$$

$$\frac{0.5}{(2\pi)^{5/2}\sigma} \exp\left(\frac{-\sum_{i=1}^{6}(r_i + \mu_i/\sqrt{8})^2}{2\sigma^2}\right),$$

for $i \in \{1, 25, \ldots, 366\}$

The likelihood functions can now be formed from the conditional probabilities. The following likelihood functions are obtained;

$$L_{1,1} = \prod_i p_1(r_i \mid H_1) \quad (10)$$

$$L_{2,2} = \prod_i p_1(r_i \mid H_2) \prod_i p_2(r_i, r_{i+1} \mid H_2), \quad (11)$$

$$L_{2,4} = \prod_i p_2(r_i, r_{i+1} \mid H_3) \prod_i p_3(r_i, r_{i+1}, r_{i+2} \mid H_3), \quad (12)$$

-continued $$L_{2,4} = \prod_i p_5(r_i, r_{i+1}, \ldots r_{i+4} \mid H_4) \prod_i p_6(r_i, r_{i+1}, \ldots r_{i+5} \mid H_4), \quad (13)$$

where the subscripts on the likelihood functions, L, indicate Rate Set 2 and hypothesis $H_1$, $H_2$, $H_3$, and $H_4$, respectively. Note that the terms $2\pi$ and $\sigma$ which multiply each exponential term can be ignored since they result in an equal scaling for each of the likelihood functions. The $\sigma^2$ term inside the exponential terms may not be ignored. Expressions have now been developed for the likelihood of each received rate corresponding to each frame. Assuming that the source rates are equally likely, then the decision rule corresponds to computing the expressions (10)–(13) and choosing the rate corresponding to the largest expression. In a similar fashion, the likelihood terms for a Rate Set 1 frame can be developed. The resulting terms are $$L_{1,1} = \prod_i p_1(r_i \mid H_1) \quad (14)$$

$$L_{1,2} = \prod_i p_2(r_i, r_{i+1} \mid H_2) \quad (15)$$

$$L_{1,3} = \prod_i p_4(r_i, r_{i+1}, r_{i+2}, r_{i+3} \mid H_3) \quad (16)$$

$$L_{1,4} = \prod_i p_8(r_i, r_{i+1}, \ldots r_{i+7} \mid H_4) \quad (17)$$

where the first and second subscripts of L indicate Rate set 1, and the corresponding hypothesis, respectively; and $i \in \{1, 2, 3, 4, \ldots, 384\}$ for $L_{1,1}$, $i \in \{1, 3, 5, \ldots, 383\}$ for $L_{1,2}$, $i \in \{1, 5, 9, \ldots, 381\}$ for $L_{1,3}$, and $i \in \{1, 9, 17, \ldots, 377\}$ for $L_{1,4}$. For example, the conditional probability for Rate Set 1, given hypothesis, $H_1$, is given by $$p_1(r_i \mid H_1) = \int_{m1} p_1(r_i \mid H_1, m1) p(m1) dm1 = \quad (18)$$
$$\frac{0.5}{\sqrt{2\sigma^2}} \exp\left(\frac{-(r_i - \mu_i)^2}{2\sigma^2}\right) + \frac{0.5}{\sqrt{2\pi\sigma}} \exp\left(\frac{-(r_i + \mu_i)^2}{2\sigma^2}\right),$$

where $i \in \{1, 2, 3, \ldots 384\}$, $\mu$ corresponds to the mean of the distribution for a full-rate frame, and $\sigma$ is the standard deviation of the noise plus interference at the input to the detector. Note that the latter two values will differ from those corresponding to the Rate Set 2 frame.

The likelihood functions (10)–(13) and (14)–(17) require knowledge of the mean amplitude level, $\mu_i$, for the full-rate frame as well as the variance, $\sigma$. Since these parameters are not known a priori, and because of signal amplitude variations common in a mobile channel, it is necessary to estimate them at the receiver. Some relatively simple methods that provide an acceptable level of performance are discussed hereinbelow.

The amplitude estimate, $\hat{\mu}_i$, is derived at the mobile receiver from the forward link punctured power control bits, where it is assumed that these bits are always sent corresponding to the energy of a full rate coded bit. For Rate set 1, according to IS-95, each power control bit, which is punctured into the forward link, replaces two coded bits (i.e., the equivalent of one information bit). For the performance results that follow (Rate set 1), the received energy corresponding to two coded bits (one power control bit) is coherently combined, and four power control bit estimates-the current power control bit estimate and three previous power control bit estimates-are non-coherently combined followed by normalization to form one estimate $\hat{\mu}_i$.

One variance estimate, $\hat{\sigma}^2$, is derived per frame from the pilot channel. Since the pilot channel corresponds to an unmodulated Walsh code (Walsh code 0), after PN despreading and phase correction, a variance estimate for the entire frame is derived simply by summing the samples over the imaginary portion of the Pilot channel, squaring, and normalizing. The resulting estimates $\hat{\mu}_i$ and $\hat{\sigma}$ are then substituted for the terms $\mu_i$ and $\sigma$ in expressions (10)–(12) and (14)–(17).

Although one statistical algorithm has been disclosed for determining the rate from examining data, it should be understood that any other algorithm could be utilized to determine the rate. Additionally, the rate determination need not be statistical, as it is anticipated that other non-statistical algorithms or techniques could be utilized.

Figure 5:
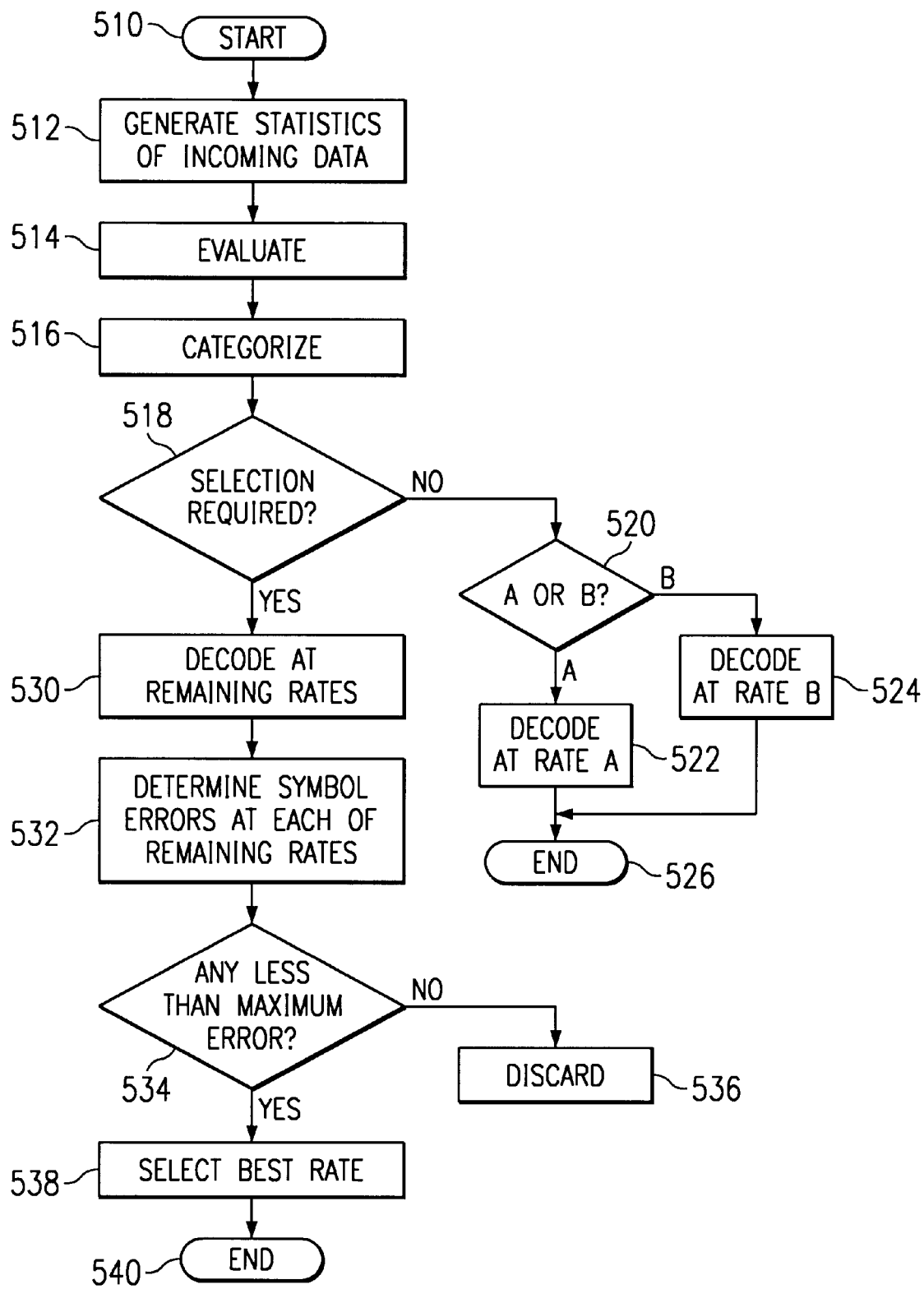
FIG. 5 illustrates a flowchart for the operation of the multi-rate decoding system of the disclosed embodiment.

Referring now to FIG. 5, there is illustrated a flowchart depicting the operation of selection and processing. The program is initiated at a Start block 510 and then proceeds to a function block 512 to generate statistics of incoming data. This requires, as described hereinabove, buffering of incoming data in the buffer 310. Once the data is buffered and the statistics are generated, the statistics are evaluated, as indicated by a block 514. Once evaluated, the statistics are categorized, as indicated by a block 516, and then selection is determined. If the categorization is such that the data rate can be finitely determined from this evaluation (to the extent that the statistical analysis allows a, finite determination), then parallel processing and selection will not be required. This is indicated by a decision block 518. If no selection is required, indicating decoding paths 314 or 316, the program will flow along the "N" path to a decision block 520 to determine whether it takes either the decoding path 314 or the decoding path 316, these indicated as an "A" or a "B" path, respectively. If the "A" path is selected, the program flows to a function block 522 in order to decode at that rate, this being the 9600 bps rate on decoding path 314. If it is the other rate, the half rate, the program will flow along the "B" path to a function block 524 to decode data at that rate. It is noted that this decoding operation, either the "A" decode or the "B" decode operation, is a process certain, that is, once the decision has been made, the data is decoded at one of the two rates and then decoded data output. If this data is determined to be erroneous, then that data frame is deemed erroneous and will be discarded until the next frame. Once decoded, the program flows from either the block 522 or the block 524 to an End block 526.

If selection is required after the data is decoded, the program flows from the decision block 518 along a "Y" path to a function block 530 in order to decode the data at the remaining rates, this being a parallel process operation, as described hereinabove. Initially, the program must flow to a function block 532 in order to determine the symbol errors at each of the remaining rates. This requires the information to be processed along both decoding paths associated with the quarter-rate and eighth-rate data, requiring full decoding of the data at both data rates and buffering thereof. The symbol errors are determined in the block 428, the rate selection block. Once the symbol errors are determined, the program will flow to a decision block 534 to determine if any of the data rates are less than a maximum error value. If not, this indicates that the errors are too high and the program flows along an "N" path to a function block 536 to discard the data as being erroneous. However, if the error rates are both less than the maximum error rate, this indicates that one of the error rates is an acceptable error rate and the program will flow to a function block 538 to select the best data rate decoding path, and then to an End block 540.

In summary, there has been provided a multiple data rate selection process wherein a preprocessing operation is performed to select from an analysis of the data, one or more decoding operations. The selection can either be a finite decision as to the data rate of the received data prior to decoding or it can be a decision that decoding is required in order to decide the data rate of the data. If a finite decision is made as to the data rate of the data, then the data will be processed at that rate. However, if the selection process makes a determination that decoding at multiple rates is required by a parallel processing method, then decoding is performed at all of the desired data rates in order to make this determination. This requires these remaining rates to be evaluated after decoding and then the decoded data buffered and a decision made for output of the select one of the buffered decoded data.

Although the preferred embodiment has been described in detail, it should be understood that various changes, substitutions and alterations can be made therein without departing from the spirit and scope of the invention as defined by the appended claims.

What is claimed is:

1. In a receiver of a variable-rate communication system, a method for determining a data rate of a received signal having contained therein encoded data, comprising the steps:

receiving the encoded data;

evaluating the encoded data utilizing predetermined data rate criteria to determine if the encoded data is associated with at least one data rate;

if the data rate is determined in the step of evaluating to be at the at least one data rate, then decoding the encoded data at the at least one data rate;

if the data rate is determined in the step of evaluating to not be at the at least one data rate, then:

decoding the encoded data at multiple different data rates other than the at least one data rate in separate decoding operations for each rate;

evaluating the quality of the decoding operation at the output of each of the separate decoding operations at the multiple different data rates;

comparing the results of the evaluation step of the quality of the multiple and separate decoding operations to predetermined selection criteria; and selecting the one of the multiple separate decoding operations that meets the predetermined selection criteria and outputting the decoded data therefrom as the desired decoded data.

2. The method of claim 1, wherein the predetermined data rate criteria comprises a statistical analysis.

3. The method of claim 1, wherein the separate decoding operations at the multiple data rates other than the one data rate operate in parallel.

4. The method of claim 1, wherein the step of decoding the encoded data at the multiple different data rates in the separate decoding operations is operable to buffer the decoded data at the output thereof prior to step of selecting.

5. The method of claim 1, wherein the step of decoding, evaluating, comparing and selecting the encoded data at multiple different data rates other than the one data rate comprises the steps of:

decoding and re-encoding at a first data rate the received signal to produce a first received signal prediction;

comparing the first received signal prediction to the received signal and counting a first number of errors, wherein an error occurs when the received signal does not match the first received signal prediction, and wherein the first number of errors define a first error metric;

reducing the received signal to produce a second received signal representing a second data rate;

decoding and re-encoding at the second data rate the second received signal to produce a second received signal prediction;

comparing the second received signal prediction to the second received signal and counting a second number of errors, wherein an error occurs when the second received signal does not match the second received signal prediction, and wherein the second number of errors define a second error metric; and predicting the data rate of the received signal based on a comparison of each of the first and second error metrics.

6. The method of claim 1, wherein the step of decoding at the one data rate or at the multiple different data rates other than the one data rate includes the step of decoding with a Viterbi algorithm.

7. The method of claim 1, wherein the one data rate comprises the highest data rate.

8. The method of claim 7, wherein the step of decoding the enabled data at the multiple different rates other than the at least one data rate comprises first reducing the received signal to the data rate associated with each of the separate decoding operations from the received signal at the at least one data rate.

9. In a receiver of a variable-rate communication system, a method for determining a data rate of a received signal having contained therein encoded data, comprising the steps:

receiving and storing encoded data in a data buffer;

analyzing the encoded data in an encoded data analyzer in accordance with predetermined criteria to determine if the buffered encoded data was transmitted at one of select data rates;

providing a plurality of dedicated decoding paths, one for each of said select data rates and wherein each is operable to decode data thereto at the associated data rate;

providing a parallel decoding path; and directing the buffered encoded data to either the one of said dedicated decoding paths associated with the determined one of said select data rates or to the parallel decoding path if the step of analyzing the encoded data determines that the data rate is not one of the select data rates; and determining the data rate in the parallel data path by the steps of:

decoding the encoded data with a plurality of parallel decoders, one for each of the data rates other than the select data rates, evaluating the decoded data from each of the parallel decoders in accordance with predetermined error criteria operable to generate an error metric representing such evaluation for each of the parallel decoders, comparing the error metrics of the parallel decoders with predetermined error criteria to determine which of the parallel decoders has error metrics associated therewith meeting the error criteria, and outputting the decoded data from the one of the parallel decoders determined to have the acceptable error metrics associated therewith.

10. The method of claim 9, wherein at least of the select data rates is the highest data rate.

11. The method of claim 9, wherein each of the plurality of dedicated decoding paths includes a dedicated decoder for decoding data directed thereto.

12. The method of claim 11, wherein the dedicated decoder includes a Viterbi decoder.

13. The method of claim 11, wherein one of the dedicated decoding paths operates at the highest data rate of the system, and the remaining operate at lower data rates, the remaining ones of the dedicated decoding paths associated with the lower than maximum data rates and the step of decoding with the parallel decoders comprising the step of reducing the received signal to produce a second received signal representing the associated data rate less than the maximum data rate.

14. The method of claim 9, wherein each of the plurality of parallel decoders include Viterbi decoders.

15. The method of claim 9, wherein the step of evaluating the decoded data comprises the steps of:
re-encoding the output of the associated parallel decoder to provide a prediction of the decoding operation as a received signal prediction; and
for each of said decoders, comparing the prediction output of the step of re-encoding and the signal input to the associated parallel decoder, and counting the number of errors that occur, wherein an error occurs when the received signal does not match the associated received signal prediction determined in the associated step of re-encoding, which error count comprises an error metric therefor.

16. The method of claim 9, wherein the step of evaluating the encoded data analyzes the encoded data in accordance with a predetermined statistical analysis routine that examines the received data sequence in accordance with predetermined statistical analysis parameters.

17. The method of claim 9, wherein ones of the parallel decoders operate at less than a full data rate and the step of decoding associated therewith including the step of reducing the encoded data from the data buffer to produce a signal at associated data rate.

18. A data receiver for a variable-rate communication system comprising:
a data buffer for receiving and storing encoded data;
an encoded data analyzer for analyzing data in accordance with predetermined criteria to determine if said buffered encoded data was transmitted at one of select data rates;
a plurality of dedicated decoding paths, one for each of said select data rates and wherein each is operable to decode data thereto at the associated data rate;
a parallel decoding path; and
a path selector for directing said buffered encoded data to either the one of said dedicated decoding paths associated with the determined one of said select data rates or to said parallel decoding path if said encoded data analyzer determines that said data rate is not one of said select data rates; and
said parallel data path having:
a plurality of parallel decoders, one for each of said data rates other than said select data rates, each of said decoders operable to decode the received data,
a decoded data analyzer for evaluating said decoded data from each of said parallel decoders in accordance with predetermined error criteria operable to generate an error metric representing such evaluation for each of said parallel decoders,
a comparator device for comparing said error metrics of said parallel decoders with predetermined criteria to determine which of said parallel decoders has error metrics associated therewith meeting said criteria, and
outputting the decoded data from the one of said parallel decoders determined to have the acceptable error metrics associated therewith.

19. The data receiver of claim 29, wherein at least of said select data rates is the highest data rate.

20. The data receiver of claim 18, wherein each of said plurality of dedicated decoding paths comprises a dedicated decoder for decoding data directed thereto.

21. The data receiver of claim 20, wherein said dedicated decoder comprises a Viterbi decoder.

22. The data receiver of claim 20, wherein one of said dedicated decoding paths operates at the highest data rate of the system, and the remaining operate at lower data rates, the remaining ones of said dedicated decoding paths associated with the lower than maximum data rates having associated therewith a symbol reducer for reducing the received signal to produce a second received signal representing the associated data rate less than the maximum data rate.

23. The data receiver of claim 18, wherein each of said plurality of parallel decoders comprise Viterbi decoders.

24. The data receiver of claim 18, wherein said decoded data analyzer comprises:
a re-encoder for re-encoding the output of said associated parallel decoder to provide a prediction of the decoding operation as a received signal prediction; and
a comparator device associated with each of said decoders for comparing the prediction output of said re-encoder and the signal input to said associated parallel decoder, and counting the number of errors that occur, wherein an error occurs when said received signal does not match said associated received signal prediction on the output of said re-encoder, which error count comprises an error metric therefor.

25. The data receiver of claim 18, wherein said encoded data analyzer analyzes data in accordance with a predetermined statistical analysis routine that examines the received data sequence in accordance with predetermined statistical analysis parameters.

26. The data receiver of claim 18, wherein ones of said parallel decoders operate at less than a full data rate and each having associated therewith on the input a signal reducer for reducing said encoded data from said data buffer to produce a signal at said associated data rate.

27. In a receiver of a variable-rate communication system, a method for determining a data rate of a received signal having contained therein encoded data, comprising the steps:
receiving encoded data;
analyzing the encoded data in accordance with predetermined criteria to determine if the received encoded data was transmitted at one of select data rates;
providing a plurality of dedicated decoding paths, one for each of said select data rates and wherein each is operable to decode data thereto at the associated data rate;
providing a parallel decoding path; and
directing the encoded data to either the one of said dedicated decoding paths associated with the determined one of said select data rates or to the parallel decoding path if the step of analyzing the encoded data determines that the data rate is not one of the select data rates; and determining the data rate in the parallel data path by the steps of:
  decoding the encoded data with a plurality of parallel decoders, one for each of the data rates other than the select data rates,
  evaluating the decoded data from each of the parallel decoders in accordance with predetermined error criteria operable to generate an error metric representing such evaluation for each of the parallel decoders,
  comparing the error metrics of the parallel decoders with predetermined error criteria to determine which of the parallel decoders has error metrics associated therewith meeting the error criteria, and
  outputting the decoded data from the one of the parallel decoders determined to have the acceptable error metrics associated therewith.

28. In a receiver of a variable-rate communication system, a method for determining a data rate of a received signal having contained therein encoded data, comprising the steps:

receiving encoded data;

analyzing the encoded data to determine if the received encoded data was transmitted at one of select data rates;

providing a plurality of dedicated decoding paths, one for each of said select data rates and wherein each is operable to decode data thereto at the associated data rate;

providing a parallel decoding path; and directing the encoded data to either the one of said dedicated decoding paths associated with the determined one of said select data rates or to the parallel decoding path if the step of analyzing the encoded data determines that the data rate is not one of the select data rates; and determining the data rate in the parallel data path by the steps of:
  decoding the encoded data with a plurality of parallel decoders, one for each of the data rates other than the select data rates,
  evaluating the decoded data from each of the parallel decoders in accordance with predetermined error criteria operable to generate an error metric representing such evaluation for each of the parallel decoders,
  comparing the error metrics of the parallel decoders with predetermined error criteria to determine which of the parallel decoders has error metrics associated therewith meeting the error criteria, and
  outputting the decoded data from the one of the parallel decoders determined to have the acceptable error metrics associated therewith.

29. In a receiver of a variable-rate communication system, a method for determining a data rate of a received signal having contained therein encoded data, comprising the steps:

receiving encoded data;

analyzing the encoded data in accordance with predetermined criteria to determine if the received encoded data was transmitted at one of select data rates;

providing a plurality of dedicated decoding paths, one for each of said select data rates and wherein each is operable to decode data thereto at the associated data rate;

providing a parallel decoding path; and directing the encoded data to either the one of said dedicated decoding paths associated with the determined one of said select data rates or to the parallel decoding path if the step of analyzing the encoded data determines that the data rate is not one of the select data rates.

30. In a receiver of a variable-rate communication system, a method for determining a data rate of a received signal having contained therein encoded data, comprising the steps:

receiving the encoded data;

evaluating the encoded data to determine if the encoded data is associated with at least one data rate;

if the data rate is determined in the step of evaluating to be at the at least one data rate, then decoding the encoded data at the at least one data rate;

if the data rate is determined in the step of evaluating to not be at the at least one data rate, then:
  decoding the encoded data at multiple different data rates other than the at least one data rate in separate decoding operations for each rate;
  evaluating the quality of the decoding operation at the output of each of the separate decoding operations at the multiple different data rates;
  comparing the results of the evaluation step of the quality of the multiple and separate decoding operations to predetermined selection criteria; and
  selecting the one of the multiple separate decoding operations that meets the predetermined selection criteria and outputting the decoded data therefrom as the desired decoded data.

* * * * *